March 2 1943. W. L. HANSEN ET AL 2,312,900
BALANCED BRUSH FOR ELECTRIC MOTORS
Filed Jan. 27, 1942
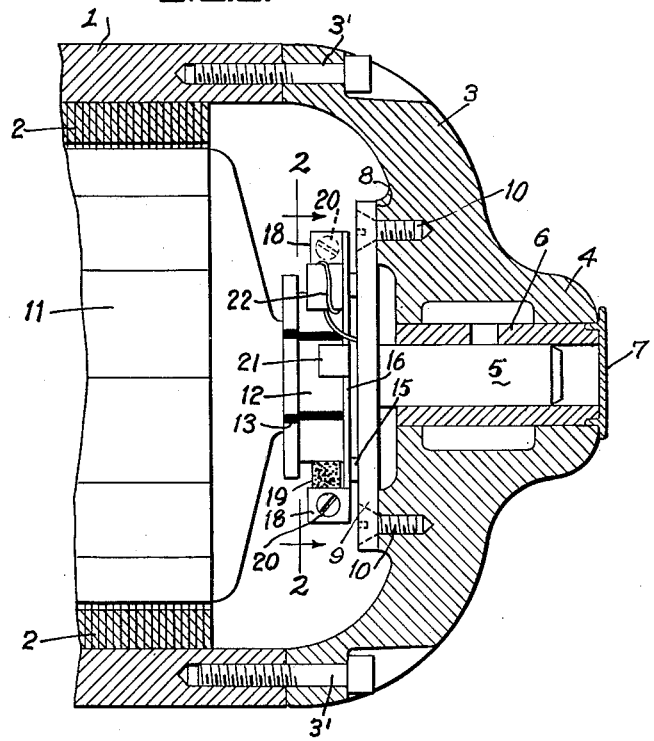
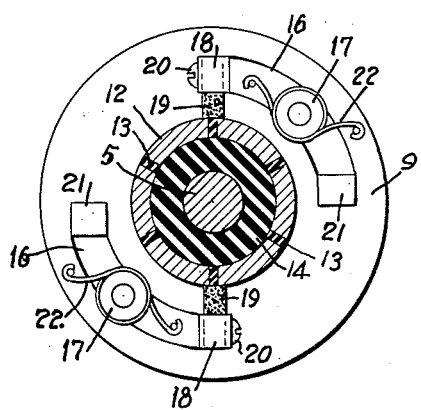
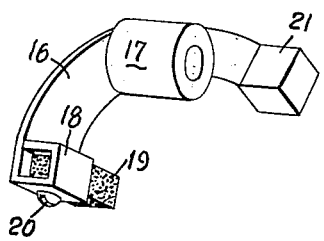
Inventors
WILLIAM L. HANSEN,
BY IRA N. HURST,
Toulmin & Toulmin
Attorneys Patented Mar. 2, 1943

2,312,900

UNITED STATES PATENT OFFICE 2,312,900

BALANCED BRUSH FOR ELECTRIC MOTORS

William L. Hansen and Ira N. Hurst, Princeton, Ind., assignors to Hansen Mfg. Company, Inc., Princeton, Ind., a corporation of Indiana Application January 27, 1942, Serial No. 428,418

5 Claims. (Cl. 171—324)

The present invention relates to electric motors and generators, particularly those which are employed in places which subject the rotating parts to shock or excessive vibration, thus tending to move the brushes momentarily away from the commutator, collector, or slip ring.

Electric motors and generators are often employed in conectnion with apparatus which is subjected to considerable vibration, as for example automotive engines engaged in furnishing power of an intermittent or highly variable character as when the load on the motor, generator, or engine is either suddenly applied or withdrawn. The vibrations under these conditions may become so severe that the brushes will momentarily leave the commutator, collector, or slip ring causing destructive sparks and interfering with the production of the mechanical or electrical power. It is customary in attempting to relieve this tendency for the brushes to move to apply a strong spring against the end of the brush, thus forcing the brush hard against the rotating conductive surface, but the pressure on the commutator or ring causes friction, heat, etc., and in the case of miniature machines may account for a large portion of the developed mechanical or electrical power.

The primary object of the invention is to reduce but preferably completely to eliminate this movement between the brushes and commutator or ring regardless of the amount of attendant vibration to the end that the brushes are held firmly against the commutator but without undue friction.

Another object is to provide an improved brush gear for motors or generators in which the brush or brushes are caused to make continuous contact with the commutator or ring even under strong vibratory or shock conditions.

These objects are attained in brief by providing a pivoted brush holder or arm, one end of which carries the brush and the other end is counterweighted to cause the arm to rotate about the pivot in a direction opposite from the direction in which the brush tends to move from the commutator or ring under severe vibratory conditions.

Other objects and features will be apparent as the specification is perused in connection with the accompanying drawing, in which:

Figure 1 is a sectional end view of a direct current motor or generator provided with the improved brush gear;

Figure 2 is a view taken along the line 2—2 in Figure 1 showing the brush holder in elevation;

Figure 3 is a perspective view of the brush and its holder.

Referring more particularly to Figure 1, numeral 1 designates a cylindrical casing which constitutes the frame of the machine. Projecting inwardly from the casing there is a plurality of laminated pole pieces indicated at 2. The ends of the frame 1 are closed by end bearings 3 bolted at 3' to the casing 1 and which are provided with a hub 4, the latter serving as a journal for the armature shaft 5. A bushing or lining 6 of bearing metal may be interposed between the shaft and the hub, the ends of the bushing being closed by a cap 7. The inner surface of each end bearing 3 is provided with an inwardly projecting or upstanding annular ledge 8 which serves as a seat for a metal plate 9 to which it may be screwed as indicated at 10. As will be explained hereinafter, the plate 9 serves as an anchor surface for the improved brush gear.

The armature 11 of the motor is of any conventional design, the windings (not shown) of the armature co-operating with field windings (not shown) which may be positioned within slots contained in the pole pieces 2. If desired, field coils may be provided about the pole pieces as is well-known in the art. The conductors from the armature are connected in their usual series parallel relation and are taken to a number of commutator segments 12 which are insulated from one another, as indicated at 13, and are mounted on an insulating tube 14, the latter being in turn secured to the shaft 5.

When the regulation form of brush gear is employed to either transmit current to or away from the typical commutator as shown, it has been found that the brushes tend to leave the commutator momentarily when the machine is subjected to severe vibration or shock. Even if a gap is left between the brush and commutator only momentarily, sparks are apt to appear which cause pitting of the commutator and other deleterious results, such as hard starting in the case of a motor and fluctuations of voltage in the case of a generator. Any attempt to assure a continuous contact between the brush and the commutator under all conditions of vibration by increasing the spring tension applied to the individual brushes serves to increase the friction between the brush and the commutator, thus reducing the life of the contacting elements. However, in accordance with the present invention, strict maintenance of contact between the brush and the commutator is assured even under extreme vibration or shock conditions without necessitating any change in the normal tension exercised by the pressure spring.

The improved brush gear is supported on the plate 9 by means of outwardly projecting spindles 15 which serve as a pivot for two or more arcuate shaped arms 16 (Figure 3). These arms are provided with an apertured boss 17 which receives the spindle 15 sufficiently loosely to permit the arm 16 to rock. One end of the arm 16 terminates in a rectangular shaped holder 18 for receiving a brush 19 of any suitable and well-known type, for example, a carbon block. The block may be adjustably held in the holder 18 by means of a clamp screw 20. At the opposite end of the arm 16 there is provided a metal element 21, preferably of rectangular shape, which serves as a counterweight for the holder 18 and its contained block 19. After the arms 16 have been mounted on the spindles 15 a tension spring 22 is applied, one end of the spring being anchored at the plate 9 and the other end being secured to the arm 16 in any suitable manner. The effect of the spring is continuously to urge the brush 19 toward the commutator surface as will be apparent from a study of Figure 2.

Now assume that vibratory or shock energy from any nearby source is communicated to the frame of the motor. For example, the motor may be mounted on an excessively vibrating automotive engine. These vibrations may be in a direction such as to tend to cause the brush 19 to swing about the spindle and away from the commutator. However, inasmuch as the counterweight 21 is positioned in the region of the brush but on the opposite side from the pivot, the same vibratory or shock force would tend also to move the counterweight in a direction away from the commutator. In other words, the vibrations would operate on the brush and its holder in such a direction as to rotate the arm 16 in a clockwise direction (Figure 3), whereas the same force operating on the counterweight will tend to move the arm 16 in a counterclockwise direction about the spindle. The arm is therefore maintained rigidly in position insofar as the effects of vibration or shock are concerned and responds to only the force exerted by the spring 22 which acts only at one end of the arm. The spring 22 can, therefore, be designed solely to provide a predetermined contact pressure between the brush and the commutator, leaving to the counterweight the sole function of maintaining this predetermined contact pressure even under extreme vibration or shock conditions.

For optimum results, it is apparent that the moment of force exercised by the counter-weight 21 should be substantially equal to that exerted by the brush and its holder. In case the counterweight 21 is heavier than the weight of the brush and its holder, the counterweight may be placed closer to the boss 17 than the holder. The proper position and weight of the element 21 to offset the effect of the brush portion which projects away from the contour of the arm 16 may be determined by calculation or experiment.

While we have illustrated our invention in connection with a direct current motor or generator, it is apparent that the use of the counter-weighted swinging arm 16 for holding the brush firmly against the commutator under vibration or shock conditions may be applied equally well to alternators or to alternating current motors, any of which may employ collector rings and slip rings.

It will be understood that we desire to comprehend within our invention such modifications as come within the scope of the claims and the invention.

Having thus fully described our invention, what we claim as new and desire to secure by Letters Patent is:

1. An electrical machine comprising a commutated armature element and a frame-supported field element in which the armature element rotates in the normal operation of the machine, a brush gear comprising an arm pivotally mounted on the frame, and having a brush holder at one end and a counterweight at the other end.

2. An electrical machine comprising a commutated armature element and a frame-supported field element in which the armature element rotates in the normal operation of the machine, a brush gear comprising a plurality of arms mounted on the frame arranged about the armature element, each of said arms being carried on a pivot positioned intermediate the ends of the arm, a brush secured to one end of the arm, and a counterweight secured to the other end of the arm.

3. An electrical machine comprising a commutated armature element and a frame-supported field element in which the armature element rotates in the normal operation of the machine, a brush gear comprising an arm pivotally mounted on the frame and having a brush holder at one end and a counterweight at the other end, the moment arm of the brush holder and contained brush about the pivot being substantially the same as the moment arm of the counterweight.

4. An electrical machine comprising a commutated armature element and a frame-supported field element in which the armature element rotates in the normal operation of the machine, a brush gear comprising an arm pivotally mounted on the frame and having a brush holder at one end and a counterweight at the other end, the weight of the holder and contained brush being substantially the same as that of the counterweight and the distances of the holder and the counterweight being substantially the same from the pivot.

5. An electrical machine comprising a commutated armature element and a frame-supported field element in which the armature element rotates in the normal operation of the machine, a brush gear comprising an arcuate arm pivoted at the middle to the frame and terminating at one end in a hollow brush holder containing a brush, said arm carrying a counterweight at the other end, the weight of the holder and brush times its distance from the pivot being substantially equal to the weight of the counterweight times its distance from the pivot.

WILLIAM L. HANSEN.
IRA N. HURST.